US006733623B2

United States Patent
Wu et al.

(10) Patent No.: US 6,733,623 B2
(45) Date of Patent: May 11, 2004

(54) APPARATUS AND METHOD FOR ADHERING A FLEXIBLE FILM TO A VENTILATED PLATEN WITHOUT AIR ENTRAPMENT

(75) Inventors: Xue-Xian Wu, Shinjuang (TW); Ming-Guo Yu, Ilan (TW)

(73) Assignee: Taiwan Semiconductor Manufacturing Co., Ltd., Hsin Chu (TW)

( * ) Notice: Subject to any disclaimer, the term of this patent is extended or adjusted under 35 U.S.C. 154(b) by 311 days.

(21) Appl. No.: 09/908,288

(22) Filed: Jul. 18, 2001

(65) Prior Publication Data

US 2003/0015276 A1 Jan. 23, 2003

(51) Int. Cl.[7] ................................. B32B 31/00
(52) U.S. Cl. ................. 156/583.6; 156/285; 156/583.7; 156/583.8; 156/583.9
(58) Field of Search .............................. 156/285, 583.8, 156/583.6, 583.7, 583.9

(56) References Cited

U.S. PATENT DOCUMENTS 4,220,491 A * 9/1980 Metcalf et al. ............. 156/285

* cited by examiner

Primary Examiner—Jeff H. Aftergut
(74) Attorney, Agent, or Firm—Tung & Associates

(57) ABSTRACT

An apparatus and a method for adhering a flexible film to a ventilated platen without air entrapment problems are described. In the apparatus, a tool body and a tool lid are connected together by a hinge means in a clam-shell configuration. The tool body has a cavity formed such that a ventilated platen can be tightly positioned therein with a top surface of the platen exposed. A flexible film is mounted to an inner surface of the tool lid facing the tool body and pushed down onto the ventilated platen while air is being withdrawn from the ventilated platen. The adhesion process for the flexible film to the platen can be completed without any air entrapment problem existing between the film and the platen.

6 Claims, 2 Drawing Sheets

APPARATUS AND METHOD FOR ADHERING A FLEXIBLE FILM TO A VENTILATED PLATEN WITHOUT AIR ENTRAPMENT

FIELD OF THE INVENTION

The present invention generally relates to an apparatus and a method for adhering a flexible film to a ventilated platen without the air entrapment problem and more particularly, relates to an apparatus for adhering a flexible film to a ventilated platen without the air entrapment problem by simultaneously drawing vacuum from the surface of the ventilated platen during the adhesion process in a clam-shell tool and a method for using the tool.

BACKGROUND OF THE INVENTION

In the manufacturing of articles, a protective film is frequently adhered onto a machine part to protect it from scratching or electrostatic discharge (or arcing). For instance, one of such application is the use of a dielectric film of polymeric base that is adhered onto the surface of a metal chamber component to provide arc resistance. The electrical insulating nature of the dielectric film prevents the accumulation of electrostatic charges on the metal surface and thus, avoids the occurrence of arcing.

In semiconductor manufacturing, a polyimide or polyester based electrical insulating film is frequently used to protect a process chamber component from plasma damage due to arcing such that the lifetime of the chamber component can be extended. Without the protected film covering the metal surface, the surface will become pitted after extended usage in a plasma atmosphere. In other instances, a protective film may be adhered to a metal part to protect the part from chemical attack due to exposure to corrosive gases or liquids.

Conventionally, a dielectric film or an insulating film is adhered to a chamber component by first coating the backside of the dielectric film with an adhesive and then applying the film to the chamber component by hand and subsequently, using a hand operated tool such as a roller to roll the dielectric film surface to remove air bubbles entrapped between the dielectric film and the chamber component. This is shown in FIGS. 1A, 1B and 1C.

A chamber component 10, of a ventilated platen from a plasma process chamber is first placed in a horizontal position, as shown in FIG. 1A, for the hand application of an insulating film 12 on the top surface 14 of the platen. Since the film 12 is applied by hand, numerous air bubbles 16 are entrapped in-between the dielectric film 12 and the top surface 14 of the ventilated platen 10. After the hand application of the film on top of the ventilated platen, a roller 20 is used to roll the film 12 from one edge 22 of the platen 10 to the opposite edge 24 of the platen. While the roller 20 may squeeze out some entrapped air bubbles, a number of air bubbles 16 still remain. This is shown in FIGS. 1B and 1C. Note that the ventilated platen 10 is provided with a plurality of vent apertures 18 through the thickness of the platen. The hand rolling technique shown in FIGS. 1A–1C further causes a problem that the surface of the dielectric film is frequently scratched by the hand rolling operation.

In the plasma process chamber for semiconductor materials, a reaction byproduct of a polymeric film is frequently deposited on top of the ventilated platen 10, i.e. on top of the dielectric film 12. This is shown in FIG. 2. The polymeric film 26 deposited becomes easily dislodged from the surface of the dielectric film 12 and causes chamber contamination. The falling off of the polymeric film 26 becomes more severe as the thickness of the polymeric film deposited becomes thicker when the plasma process chamber has been used for a prolonged period of time. The chamber contamination problem caused by the presence of air bubbles 16 entrapped between the dielectric film 12 and the ventilated platen 10 severely affects the yield of the plasma process and therefore must be prevented.

It is therefore an object of the present invention to provide an apparatus for adhering a flexible film to a ventilated platen without the drawbacks or shortcomings of the conventional apparatus.

It is another object of the present invention to provide an apparatus for adhering a flexible film to a ventilated platen without any air entrapment problem in-between the film and the platen.

It is a further object of the present invention to provide an apparatus for adhering a flexible film to a ventilated platen by utilizing a specially designed clam-shell fixture for the adhesion process.

It is another further object of the present invention to provide an apparatus for adhering a flexible film to a ventilated platen without air entrapment problems by withdrawing vacuum from the ventilated platen during the adhesion process.

It is still another object of the present invention to provide an apparatus for adhering a flexible film to a ventilated platen without any air entrapment problem by using a tool body and a tool lid that are connected together in a clam-shell configuration.

It is yet another object of the present invention to provide a method for adhering a flexible film to a ventilated platen without any air entrapment problem by withdrawing air in-between the film and the platen simultaneously with the bonding of the film to the platen.

SUMMARY OF THE INVENTION

In accordance with the present invention, an apparatus and a method for adhering a flexible film to a ventilated platen without air entrapment problems are disclosed.

In a preferred embodiment, an apparatus for adhering a flexible film to a ventilated platen without air entrapment problem can be provided which includes a tool body that has a cavity therein defined by a contiguous sidewall that has a planar top surface and a bottom wall that has at least one aperture therethrough, the cavity is adapted for receiving the ventilated platen and for exposing a top surface of the platen; a tool lid that has a shape substantially similar to a planar area of the tool body, the tool lid has an inner surface for mounting the flexible film thereon and a sealing means mounted on the inner surface along a peripheral edge of the lid; and a hinge means connecting an edge of the tool body to an edge of the tool lid for sealingly engaging the two parts together in a clam-shell configuration with the sealing means on the tool lid engaging the planar top surface of the contiguous sidewall of the tool body and, with a vacuum pulled from the at least one aperture in the bottom wall of the tool body such that the flexible film can be transferred to and adheres on the top surface of the ventilated platen by an adhesive layer pre-deposited on the flexible film.

In the apparatus for adhering a flexible film to a ventilated platen without air entrapment, the tool body and the tool lid both have a circular shape. The ventilated platen may be a chamber lid for a plasma process chamber and the flexible film may be an arc-resistant film. The sealing means may be an O-ring, while the ventilated platen may have a plurality of vent holes therethrough in fluid communication with the at least one aperture in the bottom wall of the tool body. The tool lid may further include a handle means on an outer surface to facilitate the transfer of the flexible film from the tool lid to the ventilated platen.

The present invention is further directed to a method for adhering a flexible film to a ventilated platen without air entrapment problems which can be carried out by the operating steps of providing a tool body that has a cavity therein defined by a contiguous sidewall that has a planar top surface and a bottom wall that has at least one aperture therethrough; positioning the ventilated platen in the cavity, then exposing a top surface of the platen; providing a tool lid that has a shape substantially similar to a planar area of the tool body; mounting the flexible film on an inner surface of the tool lid facing the tool body and a sealing means on the inner surface along a peripheral edge of the lid; connecting a hinge means to an edge of the tool body and an edge of the tool lid for sealingly engaging the two parts together in a clam-shell configuration and engaging the sealing means on the tool lid to the planar top surface of the contiguous sidewall of the tool body; and withdrawing air from the at least one aperture in the bottom wall of the tool body while engaging the tool lid to the tool body in a clam-shell manner and transferring the flexible film to the ventilated platen by an adhesive layer pre-deposited on the flexible film.

The method for adhering a flexible film to a ventilated platen without air entrapment may further include the step of mounting a sealing means of an O-ring on the inner surface along a peripheral edge of the lid, or the step of providing the tool body and the tool lid in a circular shape, or the step of supplying the flexible film in an arc-resistant film. The method may further include the step of providing the ventilated platen with a plurality of vent holes for establishing fluid communication with the at least one aperture in the bottom wall of the tool body. The method may further include the step of mounting a handle means on an outer surface of the tool lid, or the step of pushing down the tool lid by the handle means mounted thereon to engage the tool body, or the step of engaging the tool lid to the tool body from one edge of the tool body to an opposite edge of the tool body. The method may further include the step of coating an adhesive layer on one side of the flexible film.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses an apparatus for adhering a flexible film to a ventilated platen without the air entrapment problem which consists of a tool body, a tool lid and a hinge means connecting the tool lid to the tool body in a clam-shell configuration.

The tool body has a cavity defined by a contiguous sidewall and a bottom wall. The contiguous sidewall has a planar top surface for engaging an O-ring mounted on the tool lid when the two are in an engaged position, while the bottom wall has at least one aperture for withdrawing air therethrough during the adhesion process between the film and the platen. The cavity has a shape that is exactly the same as the ventilated platen such that the platen can be positioned tightly therein with a top surface of the platen exposed for the adhesion process.

The tool lid is formed in a shape that is substantially similar to a planar area of the tool body, and may be formed of a somewhat flexible metallic material such as a thin piece of stainless steel. The tool lid has an inner surface facing the tool body for mounting a flexible film thereon. The tool lid is further equipped with a sealing means, i.e. an O-ring, that is mounted on the inner surface along a peripheral edge of the lid.

The hinge means connects an edge of the tool body to an edge of the tool lid for sealingly engaging the two parts together in a clam-shell configuration when the O-ring on the tool lid engages the planar top surface of the sidewall of the tool body, and when air is withdrawn from the at least one aperture in the bottom wall of the tool body such that the flexible film can be transferred to the top surface of the ventilated platen and to be glued thereon by an adhesive layer pre-deposited on the flexible film.

In an application of protecting a ventilated platen wherein the vent apertures are used for passing reactive gases in a plasma process, the flexible film used for adhering onto the top surface of the platen is an arc-resistant film such that any electrical discharge that may damage the platen can be avoided.

The invention further discloses a method for adhering a flexible film to a ventilated platen without the air entrapment problem which can be carried out by first providing a tool body and a tool lid which are connected together by a hinge means in a clam-configuration. A ventilated platen is then positioned in a cavity in the tool body with a top surface exposed for receiving a flexible film. A flexible film is then mounted on an inner surface of the tool lid facing the tool body and pushed down onto the top surface of the ventilated platen in a clam-shell manner, i.e. such as when a clam-shell closes onto itself, while air being withdrawn from the ventilated platen simultaneously to prevent any air entrapment between the flexible film and the platen.

Figure 1A:
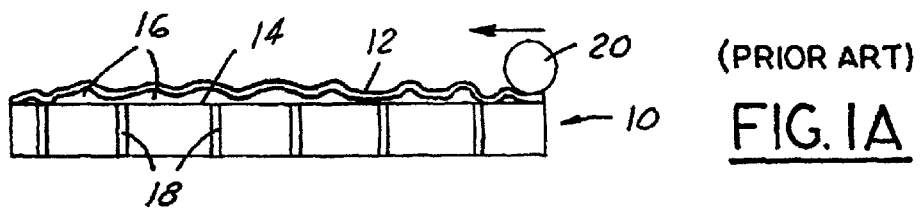
FIGS. 1A, 1B and 1C are cross-sectional views illustrating a conventional method for applying a flexible film onto a ventilated platen by a roller means resulting in air bubble entrapment.
Figure 1B:
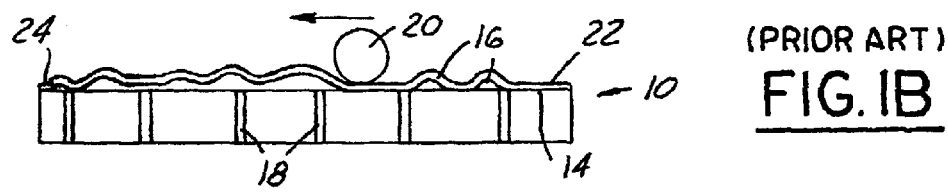
Figure 1C:
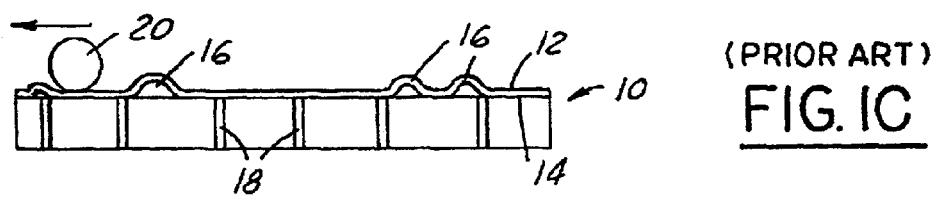
Figure 2:
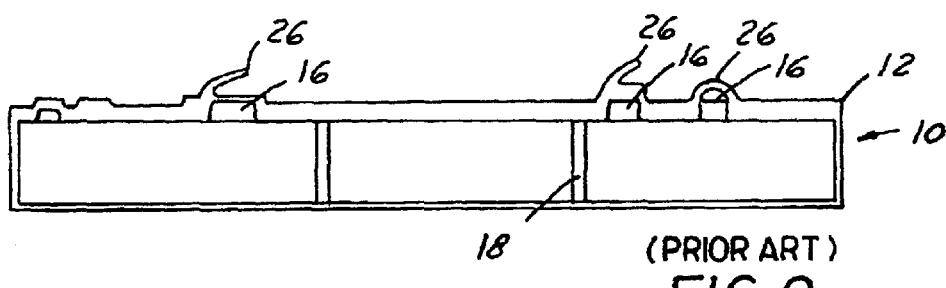
FIG. 2 is a cross-sectional view of a ventilated platen with an arc-resistant film adhered on top and a polymeric reaction byproduct film deposited on top of the arc-resistant film resulting in the peeling off of the polymeric film from the arc-resistant film.
Figure 3:
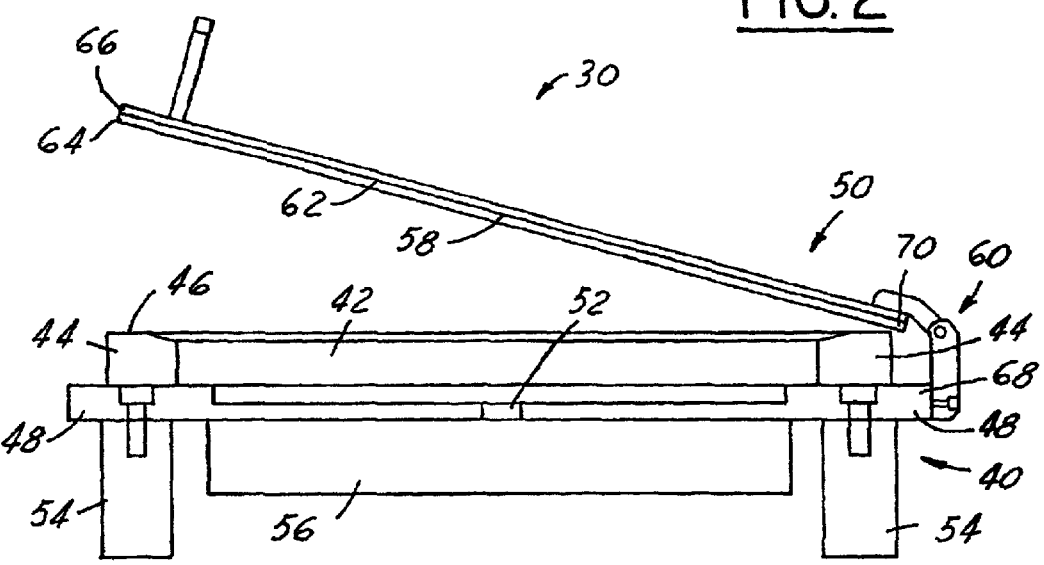
FIG. 3 is a cross-sectional view of the present invention apparatus illustrating a tool lid and a tool body connected together in a clam-shell configuration.

Referring now to FIG. 3, wherein a present invention apparatus 30 is shown. The apparatus 30 consists of a tool body 40 and a tool lid 50 connected together by hinge means 60. As shown in FIG. 3, the tool body has a cavity 42 therein defined by a contiguous sidewall 44 that has a planar top surface 46 and a bottom wall 48 equipped with at least one aperture 52. The at least one aperture 52 is used for fluid communicating with the vent apertures 18 (shown in FIGS. 1A–1C) in the ventilated platen 10. The tool body 40 is held together by a body holder 54 with a control box 56 attached thereto for providing various pneumatic and electrical controls of the apparatus 30.

Also shown in FIG. 3, is the tool lid 50 which is formed in a shape substantially similar to a planar area of the tool body, i.e. in a circular shape that has approximately the same diameter as the tool body. The tool lid 50 has an inner surface 58 for mounting a flexible film 62 thereon, and a sealing means 64, such as an O-ring formed of an elastomeric material mounted on the inner surface 58 along a peripheral edge 66 of the lid 50. The sealing means 64 is formed of a suitable elastomeric material of a desirable elasticity such that an air-tight seal between the tool lid 50 and the tool body 40 can be achieved during the adhesion process for the flexible film 62.

The hinge means 60 connects an edge 68 of the tool body 40 to an edge 70 of the tool lid 50 for sealingly engaging the two parts together in a clam-shell manner with the sealing means 64 engaging the planar top surface 46 of the contiguous sidewall 44 of the tool body 40, and with a vacuum pulled (air withdrawn) from the at least one aperture 52 in the bottom wall 48 of the tool body 40. As a consequence, the flexible film 62 is transferred to and adheres on the top surface 14 of the ventilated platen 10 by an adhesive layer (not shown) pre-deposited on the flexible film 62.

Figure 4A:
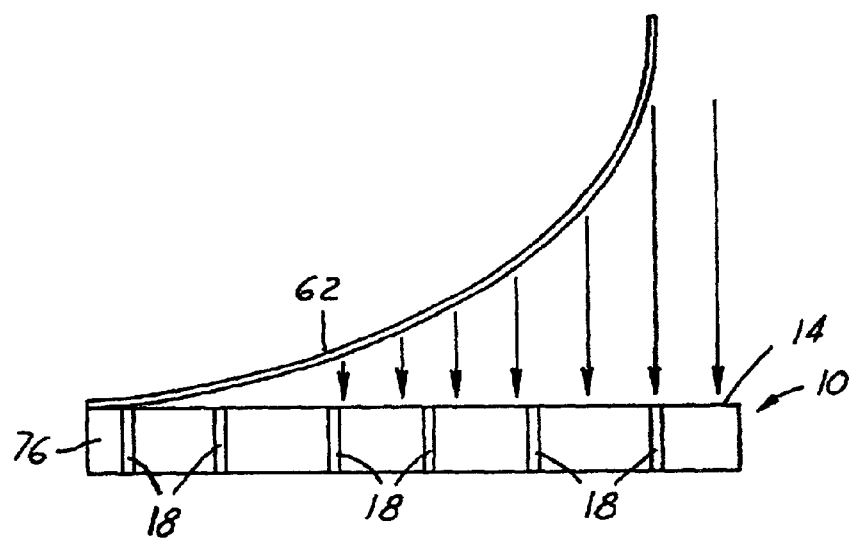
FIGS. 4A, 4B and 4C are cross-sectional views illustrating the present invention process sequence of applying an arc-resistant film to a ventilated platen while withdrawing air simultaneously with the film adhesion process resulting in no air bubble entrapment.
Figure 4B:
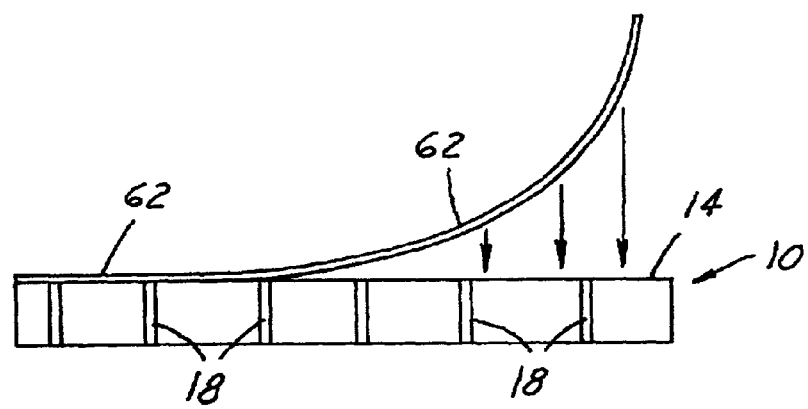
Figure 4C:
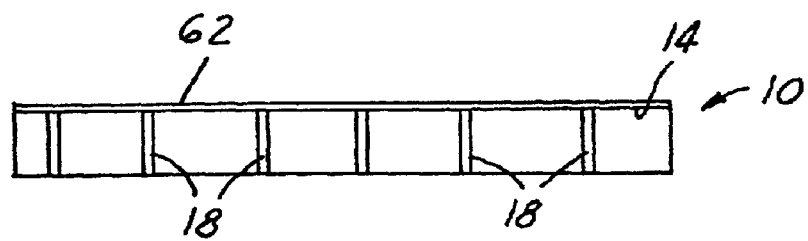

The operation of the present invention novel apparatus 30 can be shown in FIGS. 4A, 4B and 4C. For instance, when a clamshell closing operation is started by the hinge end 76 of the ventilated platen 10 while air is being withdrawn through apertures 18 through the ventilated platen 10, the flexible film 62 is gradually glued onto the top surface 14 of the platen 10 without any air entrapment. As the top lid 50 is gradually pushed onto the tool body 40, as shown in FIG. 4B, the flexible film 62 is gradually glued onto the top surface 14 until the complete film is glued onto the top surface 14 of the platen 10, as shown in FIG. 4C. No air entrapment problem exists when the present invention novel method is practiced by utilizing the novel apparatus 30. Furthermore, any potential scratch of the film surface can be avoided since no mechanical roller is used to roll the top surface of the film.

The present invention novel apparatus and method for adhering a flexible film to a ventilated platen without air entrapment problems have therefore been amply described in the above description and in the appended drawings of FIGS. 3–4C.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. An apparatus for adhering a flexible film to a ventilated platen without air entrapment comprising:

a tool body having a cavity therein defined by a contiguous sidewall having a planar top surface and a bottom wall having at least one aperture, said cavity being adapted for receiving said ventilated platen and for exposing a top surface of said platen;

a tool lid having a shape substantially similar to a planar area of said tool body, said tool lid having an inner surface for mounting said flexible film thereon and a sealing means mounted on said inner surface along a peripheral edge of said lid; and a hinge means connecting an edge of said tool body to an edge of said tool lid for sealingly engaging the two parts together in a clam-shell configuration with said sealing means on said tool lid engaging said planar top surface of said contiguous sidewall of the tool body and with a vacuum pulled from said at least one aperture in said bottom wall of the tool body such that said flexible film is transferred to and adheres on said top surface of the ventilated platen by an adhesive layer pre-deposited on said flexible film.

2. An apparatus for adhering a flexible tutu to a ventilated platen without air entrapment according to claim 1, wherein said tool body and said tool lid both have a circular shape.

3. An apparatus for adhering a flexible film to a ventilated platen without air entrapment according to claim 1, wherein said ventilated platen being a chamber lid for a plasma process chamber and said flexible film being an arc-resistant film.

4. An apparatus for adhering a flexible film to a ventilated platen without air entrapment according to claim 1, wherein said sealing means is an O-ring.

5. An apparatus for adhering a flexible film to a ventilated platen without air entrapment according to claim 1, wherein said ventilated platen having a plurality of vent holes therethrough in fluid communication with said at least one aperture in said bottom wall of the tool body.

6. An apparatus for adhering a flexible film to a ventilated platen without air entrapment according to claim 1, wherein said tool lid further comprises a handle means on an outer surface to facilitate said transfer of the flexible film from said tool lid to said ventilated platen.

* * * * *